United States Patent
Olson et al.

(10) Patent No.: US 7,770,165 B2
(45) Date of Patent: Aug. 3, 2010

(54) PROVIDING FIRMWARE UPDATES TO PORTABLE MEDIA DEVICES

(75) Inventors: Kipley J. Olson, Mercer Island, WA (US); Dennis A. Kiilerich, Kirkland, WA (US); Vlad Sadovsky, Redmond, WA (US); Kjersten Johansen Hayter, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 11/467,432

(22) Filed: Aug. 25, 2006

(65) Prior Publication Data

US 2008/0052698 A1 Feb. 28, 2008

(51) Int. Cl.
G06F 9/44 (2006.01)
G06F 9/45 (2006.01)

(52) U.S. Cl. .................. 717/168; 717/170; 709/203

(58) Field of Classification Search ......... 717/168–174, 717/203–204
See application file for complete search history.

(56) References Cited

U.S. PATENT DOCUMENTS

| | | | |
|---|---|---|---|
| 5,588,143 A | 12/1996 | Stupek, Jr. et al. | |
| 5,623,604 A * | 4/1997 | Russell et al. | 717/167 |
| 5,909,689 A | 6/1999 | Van Ryzin | |
| 6,094,684 A | 7/2000 | Pallmann | |
| 6,324,544 B1 | 11/2001 | Alam et al. | |
| 6,343,315 B1 * | 1/2002 | Stoel et al. | 709/204 |
| 6,356,949 B1 * | 3/2002 | Katsandres et al. | 709/238 |
| 6,357,021 B1 | 3/2002 | Kitagawa et al. | |
| 6,622,302 B1 * | 9/2003 | Delaney et al. | 717/170 |
| 6,640,334 B1 * | 10/2003 | Rasmussen | 717/171 |
| 6,708,231 B1 | 3/2004 | Kitagawa | |
| 6,742,176 B1 | 5/2004 | Million et al. | |
| 6,754,895 B1 | 6/2004 | Bartel et al. | |
| 6,907,602 B2 | 6/2005 | Tsai et al. | |
| 7,043,664 B1 | 5/2006 | Chiloyan | |
| 7,085,957 B2 * | 8/2006 | Sundareson et al. | 714/6 |
| 7,093,244 B2 * | 8/2006 | Lajoie et al. | 717/168 |
| 7,146,609 B2 * | 12/2006 | Thurston et al. | 717/169 |
| 7,281,132 B2 * | 10/2007 | Bender et al. | 713/172 |
| 7,421,468 B2 * | 9/2008 | Lunenfeld | 709/203 |
| 7,434,216 B1 * | 10/2008 | O'Neill et al. | 717/169 |
| 7,437,405 B1 * | 10/2008 | Theis et al. | 709/203 |

(Continued)

FOREIGN PATENT DOCUMENTS

WO 2005043532 A1 5/2005

OTHER PUBLICATIONS

Nguyen et al, "Flexible fine grained version control for software documents", IEEE APSEC, pp. 212-219, 2004.*

(Continued)

Primary Examiner—Anil Khatri
(74) Attorney, Agent, or Firm—Senniger Powers LLP

(57) ABSTRACT

A system for providing a firmware upgrade to a portable media device by comparing a version number of the firmware on the portable media device to the version number of an available firmware upgrade. The available firmware upgrade is provided by the manufacturer of the portable media device or some other trusted source and compiled in a firmware database. The firmware database is accessed when the portable media device is connected to the personal computing device. Additionally, a digital signature may be associated with a certified version of the media device firmware and used by a multimedia management application to verify the functionality of the portable media device.

17 Claims, 4 Drawing Sheets

U.S. PATENT DOCUMENTS

| | | | |
|---|---|---|---|
| 7,480,907 B1 * | 1/2009 | Marolia et al. | 717/174 |
| 7,600,224 B2 * | 10/2009 | Obayashi et al. | 717/168 |
| 7,614,098 B1 * | 11/2009 | Quarry | 5/111 |
| 7,676,803 B2 * | 3/2010 | Zhao et al. | 717/168 |
| 2002/0091807 A1 | 7/2002 | Goodman | |
| 2005/0132351 A1 | 6/2005 | Randall et al. | |
| 2005/0235015 A1 | 10/2005 | Abanami et al. | |
| 2006/0136517 A1 | 6/2006 | Creamer et al. | |
| 2007/0073747 A1 | 3/2007 | Jung et al. | |

OTHER PUBLICATIONS

Tamura et al, "Software reliability assessment and optimal version upgrade problem for open source software", IEEE, pp. 1333-1338, 2007.*

Hicks et al, "Dynamic software updating", ACM Trans. on Prog. Lang. & Sys. vol. 27, No. 6., pp. 1049-1096, 2005.*

Platen et al, "Feedback linking optimizing object code layout for updates", ACM LCTES, pp. 2-11, 2006.*

Unknown, "The Best Jukebox an d#1 Music Download Store. Now With Video," printed from http://www.apple.com/itunes/overview, printed on Aug. 24, 2006, 2 pages, 2006, Apple Computer, Inc., USA.

Unknown, "Get iPod Updater," printed from http://www.apple.com/ipod/download, printed on Aug. 24, 2006, 2 pages, 2006, Apple Computer, Inc., USA.

Prehofer et al., "An Architecture Supporting Adaptation and Evolution in Fourth Generation Mobile Communication Systems," Journal of Communications and Networks, vol. XX, No. Y, 15 pages, Jan. 1999, USA.

Hendricks et al., "Secure Bootstrap is Not Enough: Shoring up the Trusted Computing Base," Proceedings of the Elevenths SIGOPS European Workshop, ACM SIGOPS, 5 pages, Sep. 2004, Belgium.

* cited by examiner

PROVIDING FIRMWARE UPDATES TO PORTABLE MEDIA DEVICES

BACKGROUND

A wide variety of portable media devices are available on the market. These portable media devices are capable of storing and playing music, video, still photos and other media files. Because portable media devices are compact, typically small enough to fit in a pocket, the devices are convenient to store and carry audio, video, photos, and other files while walking, exercising, traveling, commuting to work or school, and driving. Portable media devices are often connected to a personal computing device through a USB (Universal Serial Bus), wireless, or other connection and managed by a multimedia management application executing on the personal computing device. Once connected, the user may transfer digital photos, music and video files between the person computing device and the portable media device.

The portable media devices include a firmware, which is a software program or set of instructions programmed on the portable media device. Firmware provides the necessary instructions for operating the portable media device and for allowing the portable media device to communicate with other devices, such as the personal computing device. Firmware can be thought of as semi-permanent because it will remain the same unless it is updated. For example, the firmware of the portable media device may need to be updated in order for it to work with a computer configured with a new version of an operating system or to increase or improve the functionality of the portable media device.

The firmware is provided by the manufacturer of the portable media device. Typically, each model of portable media device will have a unique firmware. Periodically, as the firmware is updated, the manufacturer of the portable media device or some other trusted source will release a new or updated version of the firmware. For example, manufacturers may make firmware updates available by posting a firmware update program or files on the internet and allowing the user to download the update to their personal computing device. Firmware updates are applied to the portable media device by either (1) executing the update program on the personal computing device while the portable media device is connected or (2) by copying the download firmware update from the personal computing device to the connected portable media device and signaling the portable media device to install the update. Because users are not automatically notified of firmware updates, many users are unaware when a new firmware update is available for their device. Furthermore, for those users who become aware of a new firmware update, the update process is often complicated and daunting.

SUMMARY

Embodiments of the invention include providing a firmware upgrade to a portable media device by comparing a version number of the firmware installed on the portable media device to the version number of an available firmware upgrade when the portable media device is connected to a personal computing device. The available firmware upgrades provided by the manufacturers of the portable media devices or other trusted sources are compiled in a firmware database. The firmware database is accessed by the personal computing device when the portable media device is connected to the personal computing device. In an embodiment, a digital signature may be associated with a certified version of the portable media device firmware and used by a multimedia management application to verify the functionality of the portable media device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
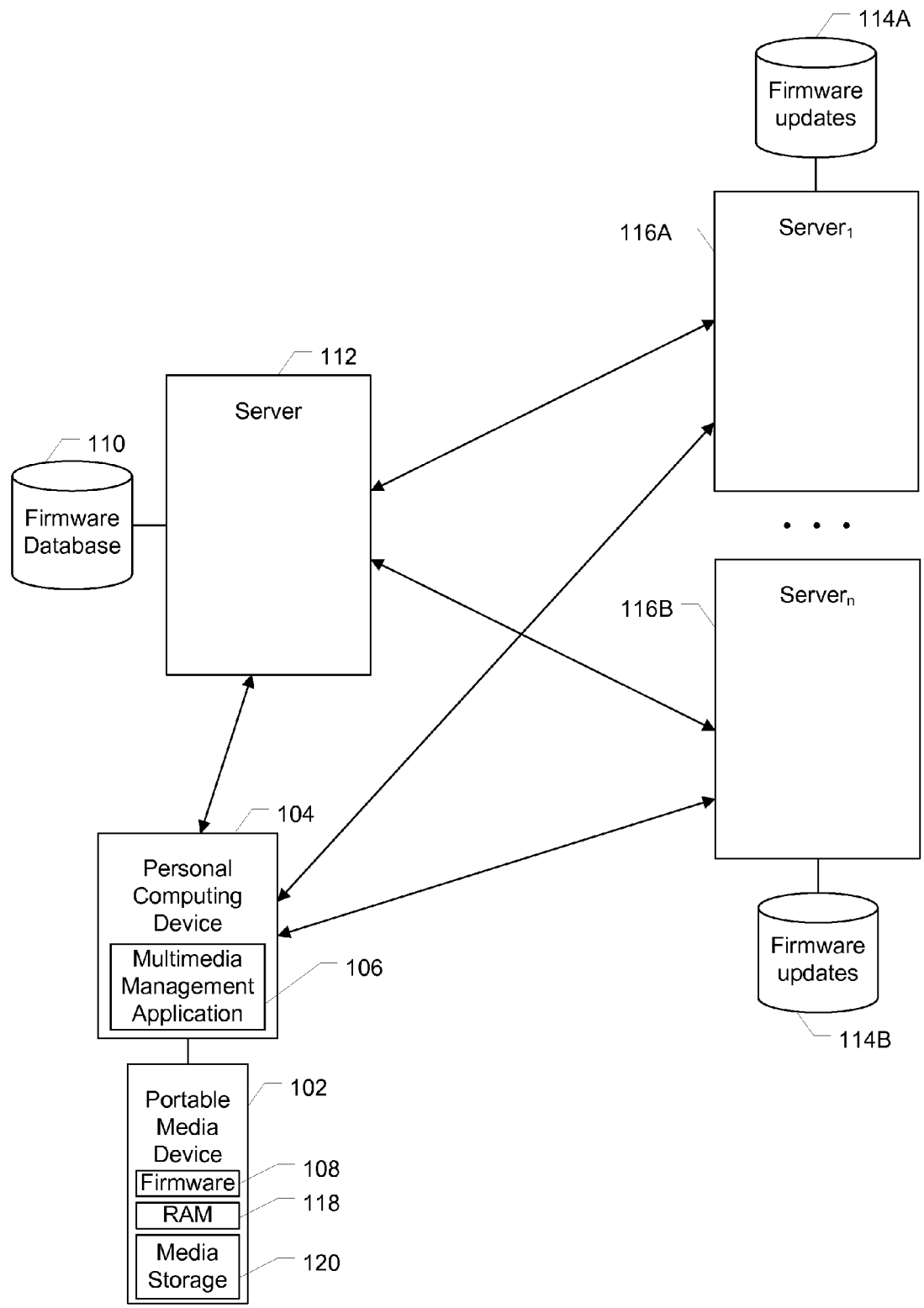
FIG. 1 is a block diagram illustrating an example of a suitable computing system environment in which the invention may be implemented.

FIG. 1 is a block diagram illustrating one example of a suitable computing environment in which a firmware update of a portable media device 102 may be implemented. The portable media device 102 is an electronic device which is capable of storing and playing files in one or more media formats. The portable media device 102 includes media storage 120 (e.g. hard disk or flash memory) for storing multimedia files. For example, media storage 120 includes ROM, EEPROM, flash memory or other memory technology, optical disk storage, magnetic disk storage or other magnetic storage devices, or any other medium that may be used to store the desired information and that may be accessed by the portable media device 102. The portable media devices 102 may also include RAM (Random Access Memory) 118.

Portable media players are often versatile, being able to load and play different formats of video, pictures, and recorded TV. Examples of media formats include: MPEG (Moving Picture Experts Group), DivX, XviD, MP3 (MPEG-1 Audio Layer 3), WAV (Waveform audio format), Ogg Vorbis, JPEG (Joint Photographic Experts Group), WMA (Windows Media Audio), WMV (Windows Media Video), ASF (Advanced Systems Format or Advanced Streaming Format) and GIF (Graphics Interchange Format). Portable media devices 102 may include the ability to record video and audio. Additionally, some portable media devices 102 include card readers for removable media for data storage and transfer. Examples of removable media include: SD (Secure Digital) and MMC (MultiMediaCard). Portable media devices 102 may also store files other than multimedia files such as data files, computer programs, game files, word processing files and text files.

Portable media devices 102 are often connected to a personal computing device 104 through a USB connection and managed by a multimedia management application 106 executing on the personal computing device 104. Alternatively, the portable media device 102 is connected to the personal computing device 104 through a wired network, direct-wired connection, or wireless connection, such as WiFi, Bluetooth, acoustic, RF, and infrared. The multimedia management application 106 manages multimedia files on the personal computing device 104 and the portable media device 102.

FIG. 1 shows several examples of a general purpose computing devices in the form of computers 104, 112, 116A, 116B. In an embodiment of the invention, a computer is suitable for use in the other figures illustrated and described herein. The computer has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data.

For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Referring again to FIG. 1, the portable media device 102 also includes firmware 108. Firmware 108 is a set of instructions programmed for the portable media device 102. The firmware 108 is the operating system of the portable media device 102 which provides the necessary instructions for the device functionality. For example, the firmware 108 provides instructions for playing media files and communicating with other devices, such as the personal computing device 104. The firmware 108 of the portable media device 102 may be updated to interface with a new version of an operating system installed on the personal computing device 104, to support a new media format, or to provide increased or improved functionality of the portable media device 102. The system memory of the portable media device 102 includes storage media in the form of removable and/or non-removable, volatile and/or nonvolatile memory. In an embodiment, the firmware 108 is stored in a flash ROM (Read Only Memory) of the portable media device 102. While ROM is "read-only memory," flash ROM can be erased and rewritten because it is actually a type of flash memory. The firmware 108 of the portable media device 102 remains the same unless it is updated or upgraded.

The firmware 108 is provided by a trusted source such as the manufacturer of the portable media device 102. Typically, each model of portable media device 102 will have a unique firmware 108. Furthermore, as the firmware 108 is updated, a version number is associated with the firmware 108. In an embodiment, the version number is an increasing value that is incremented as changes are made to the firmware 108. Thus, a firmware 108 update is available for the portable media device 102 if the firmware version number of the firmware 108 installed on the portable media device 102 is less than the version number of the latest firmware 108 release. In an embodiment, the manufacturer of the portable media device 102 or other trusted source allows the user to download the firmware update program or files 114A, 114B from servers 116A, 116B to the personal computing device 104 over the internet or through other communication networks.

A firmware database 110 is provided to inform the user when a new firmware update 114A, 114B has been released by the manufacturer of the portable media device 102 or other trusted source. The firmware database 110 is associated with a server 112. The firmware database 110 contains entries that associate models of portable media devices 102 to the most current firmware version. In an embodiment, an entry in the firmware database 110 includes a model identifier associated with the portable media device, the latest release firmware version number and a location or address of the firmware update 114A, 114B. In an alternative embodiment, an entry in the firmware database 110 includes a hardware identifier associated with the portable media device, the latest release firmware version number and a location or address of the firmware update 114A, 114B. In an embodiment, the location of the firmware update 114A, 114B is stored in a URL (Uniform Resource Locator) format.

The computers and servers 104, 112, 116A, 116B may operate in a networked environment using logical connections to one or more remote computers. The remote computer may be a personal computer, a server, a router, a network PC, a peer device or other common network node, and typically includes many or all of the elements described above relative to computers and servers 104, 112, 116A, 116B. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Figure 2:
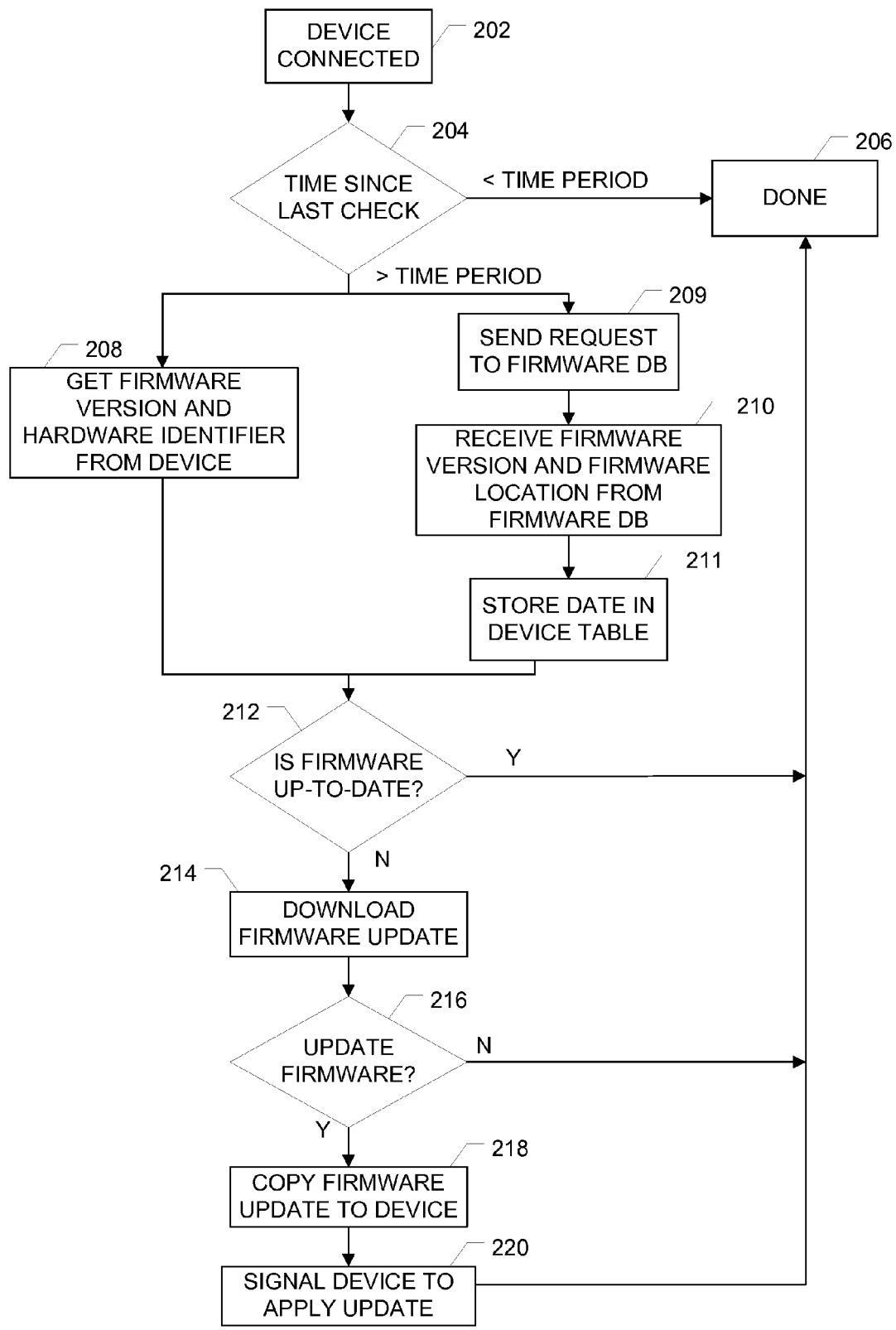
FIG. 2 is a flowchart of an exemplary embodiment of a method for upgrading the firmware of a portable media device.

In FIG. 2 a method is shown for upgrading the firmware 108 of the portable media device 102 utilizing the firmware database 110 according to an embodiment of the invention. At 202, the portable media device 102 is connected to the multimedia management application 106 executing on the personal computing device 104. In an embodiment, the portable media device 102 is connected through USB interface of the personal computing device 104. In an alternative embodiment, the portable media device 102 is connected to the personal computing device 104 through a wireless connection.

At 204, the multimedia management application 106 determines the last time the portable media device 102 was checked for a firmware update. In an embodiment, the time of the last update check will be stored in the device table in the media library of the multimedia management application 106. The multimedia management application 106 checks for the firmware update if a specified period time has elapsed since the last check. In an embodiment, the firmware check occurs if it has been more than 30 days since the last check. If the last firmware check was made within the specified period of time, the method terminates at 206. Alternatively, the user has the option of overriding the multimedia management application 106 to check for firmware updates even if the specified period of time since the last firmware check has not elapsed.

If the specified period of time since the last firmware check has elapsed, at 208, the firmware version number and hardware identifier are retrieved from the portable media device 102. In another embodiment, the firmware version number and hardware identifier are retrieved from a cache, data structure or other location available to the multimedia management application 106. At 209, the multimedia management application 106 sends a request to the firmware database 110. In an embodiment, the request includes the hardware identifier from the portable media device 102. At 210, the multimedia management application 106 receives the latest version number of firmware available for the portable media device 102 and the location or address of the firmware update 114A, 114B from firmware database 110. In an embodiment, the address is in a Universal Resource Locator (URL) format.

In an alternative embodiment, the multimedia management application 106 initiates a web request to download an XML (Extensible Markup Language) document containing the latest firmware update information. The URL used for the web request will go through a standard redirector. A redirector is software on a server computer that intercepts request for information and, when appropriate, redirects them to other servers on the network. In this embodiment, the URL for the request will be constructed as follows:

```
http://www.a.com/firmwareupdate/?locale=sLocale&geoid=
sGeoid&version=sVersion &userlocale=sUserLocale&hardwareID=
sHardwareID&firmwareversion=sFirmwareVersion&vendor=
sVendor&modelname=sModelNamemodelname=sModelName
``` where sLocale is the system locale of the operating system of the personal computing device 104; sGeoid is unique identification number for a geographical region, country, city, or location of the operating system of the personal computing device 104; sVersion is the version of multimedia management application 106; sUserLocale is the locale of the current user; sHardwareID is the hardware identifier of the portable media device 102; sFirmwareVersion is the firmware version number returned from portable media device 102; and sVendor is the manufacturer identifier returned from portable media device 102. In an embodiment, the hardware identifier of the portable media device 102 includes a vendor identifier (VID) and a product identifier (PID). In an alternative embodiment, the hardware identifier includes a Revision in addition to the VID and the PID.

The redirector uses the parameters from the request to lookup the manufacturer URL in the firmware database 110. If these parameters do not resolve to a valid firmware database 110 entry, an empty XML document will be returned and the method will terminate at 206. Alternatively, if the parameters do not resolve to a valid firmware database 110 entry, an error will be returned. If a valid firmware database 110 entry is found, the response to the web request will be returned in an XML document formatted as follows:

```
<?xml version="1.0" encoding=="UTF-16"?>
<firmwareUpdate HardwareID="rHardwareID" Version="rVersion"
Vendor="rVendor" Model="rName" Date="rDate"
DownloadURL="rDownloadURL" InfoURL="rInfoURL"> rDescription
</firmwareUpdate>
``` where rHardwareID is the hardware identifier; rVersion is the version of firmware update; rVendor is the Vendor or manufacturer name; rModel is the Model name or identifier; date is date of firmware update; rDownloadURL is the URL to download the update package from; rInfoURL is a URL to web site that provides more information on the firmware update; and rDescription is the description of the firmware update.

At 211, the multimedia management application 106 stores the date the request to the firmware database 110 was sent. In an embodiment, the date of the last request sent to the firmware database 110 is stored in a device table in a media library of a multimedia management application 106. At 212, the multimedia management application 106 compares the firmware version of the firmware 108 installed on the portable media device 102 to the firmware version obtained from the firmware database 110. The firmware upgrade is selectively applied to the connected portable media device 102 as a function of the firmware upgrade version number obtained from the firmware database 110 and the installed firmware version number. If the firmware 108 installed on the portable media device 102 is up to date, the method terminates at 206. If the firmware version installed on the portable media device 102 is out of date, the multimedia management application 106 initiates a download of the firmware update 114A from the servers 116A at 214. In an embodiment, a dialog box is displayed to the user on the personal computing device 104. The dialog box allows the user to view the progress of the download and to cancel the download, if desired. In an embodiment, the firmware update 114A is downloaded from the location specified by the rDownloadURL field of the response XML document. In an alternative embodiment, if the rDownloadURL field of the response XML document is blank, the user is prompted to visit the web site of a trusted source (e.g. the manufacturer) to download the firmware update 114A. If the user responds "yes", a web browser will be launched to the URL specified by the rInfoURL field of the response XML document and the method will terminate at 216. In other embodiments, the rInfoURL field provides a link to a detailed explanation of the firmware upgrade even if the rDownloadURL is not blank.

At 216, the user is prompted if they would like to install the firmware update 114A portable media device 102. In an embodiment, the downloaded firmware update 114A file is digitally signed to verify it is from a trusted source before the user is prompted to install the upgrade. In an alternative embodiment, the description field from the XML document is displayed to the user in the dialog box on the personal computing device 104 and the user is given three options: "yes", "no", and "not right now". If the user responds "not right now" at 216, the method terminates at 206 and the user will be prompted again to install the firmware update 114A at another time when the portable media device 102 is connected to the personal computing device 104.

If the user responds "no" at 216, the method terminates at 206 and the user will not be prompted again to install the firmware update 114A the next time the portable media device 102 is connected to the personal computing device 104. In an alternative embodiment, the method will continue to download the firmware update 114A even if the user replies no. In this embodiment, the method stores the firmware update 114A, if space is available on the personal computing device 104, and queries the user again the next time the portable media device 102 is connected to the personal computing device 104. In this embodiment, the method checks if the firmware update 114A is available locally on the personal computing device 104 before initiating the download from server 116A at 214.

If the user responds yes at 216, the firmware update 114A is copied to the portable media device 102 at 218. In an embodiment, the firmware update 114A file is downloaded in a compressed and archived format, such as a ZIP archives Each file in the archive is unpacked, copied to the connected portable media device 102, and tagged as a firmware update. Alternatively, the files are copied to the portable media device 102 and each file will be tagged as a firmware update per a Media Transfer Protocol such as MTP. MTP is a protocol for transferring media files and associated metadata to/from portable media devices, with optional additional support for remote control of the device, reading and setting of portable media device parameters such as special DRM (Digital Rights Management)-related device parameters for protected content. In other alternative embodiments, the firmware update file is transferred to the portable media device per the Picture Transfer Protocol (PTP), PTP/IP, and other related protocols for transferring media files and associated metadata to/from portable media devices. The dialog box described above shows progress of the overall transfer of the unpacked firmware update 114A files. If the user hits cancel at this time, any firmware update files previously copied to the portable media device 102 will be deleted.

At 220, the multimedia management application 106 signals the portable media device 102 to apply the firmware update 114A files. In an embodiment, the portable media device 102 is notified that there are new firmware updates are available. Upon receiving this notification, the portable media device 102 disconnects (logically, not physically) from the personal computing device 104. A prompt is displayed to the user on the portable media device 102 asking for permission to apply the new updates. If the user responds yes, the portable media device 102 will upgrade itself using the files found in the update folder. When firmware update is complete, the portable media device 102 will re-connect (logically, not physically) to the multimedia management application 106 of the personal computing device 104.

Figure 3:
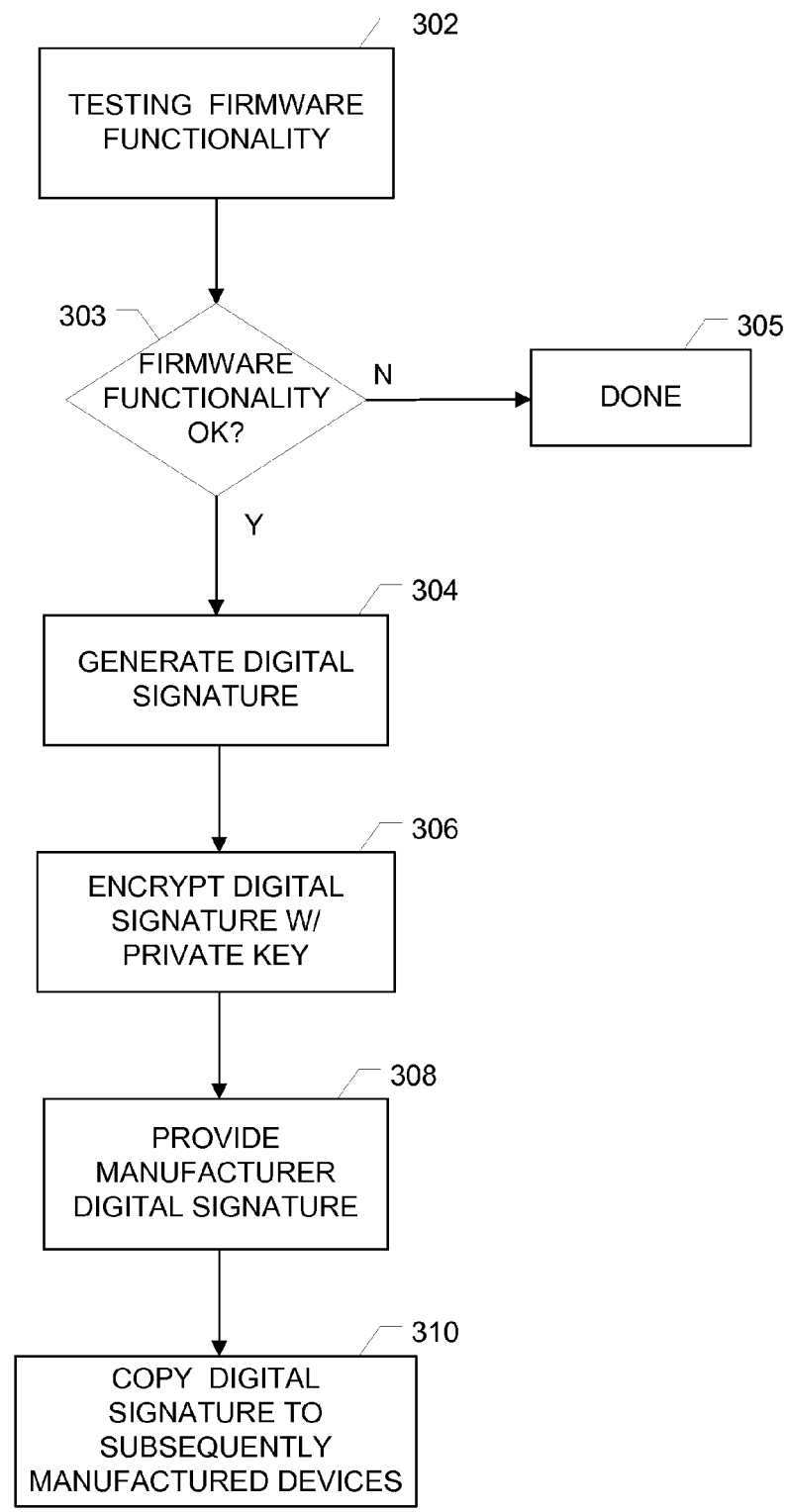
FIG. 3 is a flowchart of an exemplary embodiment of a method for certifying the firmware of a portable media device.

FIG. 3 illustrates an embodiment of a method of verifying the firmware 108 provided by a manufacturer of portable media device 102 or other trusted source by a certifying agency according to the invention. For example, in an embodiment, the developer of the multimedia management application 106 may want to verify that the portable media device's 102 firmware 108 has the functionality to be compatible with the multimedia management application 106. In an alternative embodiment, for security purposes, the multimedia management application 106 may want to confirm the firmware installed on the portable media device 102 was provided by the manufacturer of the portable media device or other trusted source and not by some other malicious third party.

At 302, the portable media device 102 with the installed firmware 108 is tested by the multimedia management application 106 developers or some other certifying agency for a particular degree of functionality or a minimum set of requirements. In an embodiment, portable media devices 102 that pass the testing are allowed to use a logo indicating to the user that the portable media device 102 is compatible with similarly logo-ed digital media stores and supports music and/or movies and video.

At 303, a check is made to determine if the firmware 108 has the required functionality. If the firmware 108 does not have the required functionality, the method completes at 305. If the firmware 108 has the required functionality, at 304, a digital signature is generated. In an embodiment, the digital signature is a hash generated from the portable media device 102 manufacturer identifier and the portable media device 102 hardware identifier. In an alternative embodiment, the digital signature is a hash generated from the firmware version in addition to the portable media device 102 manufacturer identifier and the portable media device 102 hardware identifier. At 306, the digital signature is encrypted. In an embodiment, the digital signature is encrypted with a private key.

At 308, the encrypted digital signature is provided to the manufacturer of the portable media device 102. At 310, the manufacturer copies the encrypted digital signature to subsequently manufactured portable media devices 102 with the firmware 108 that was tested at 302.

Figure 4:
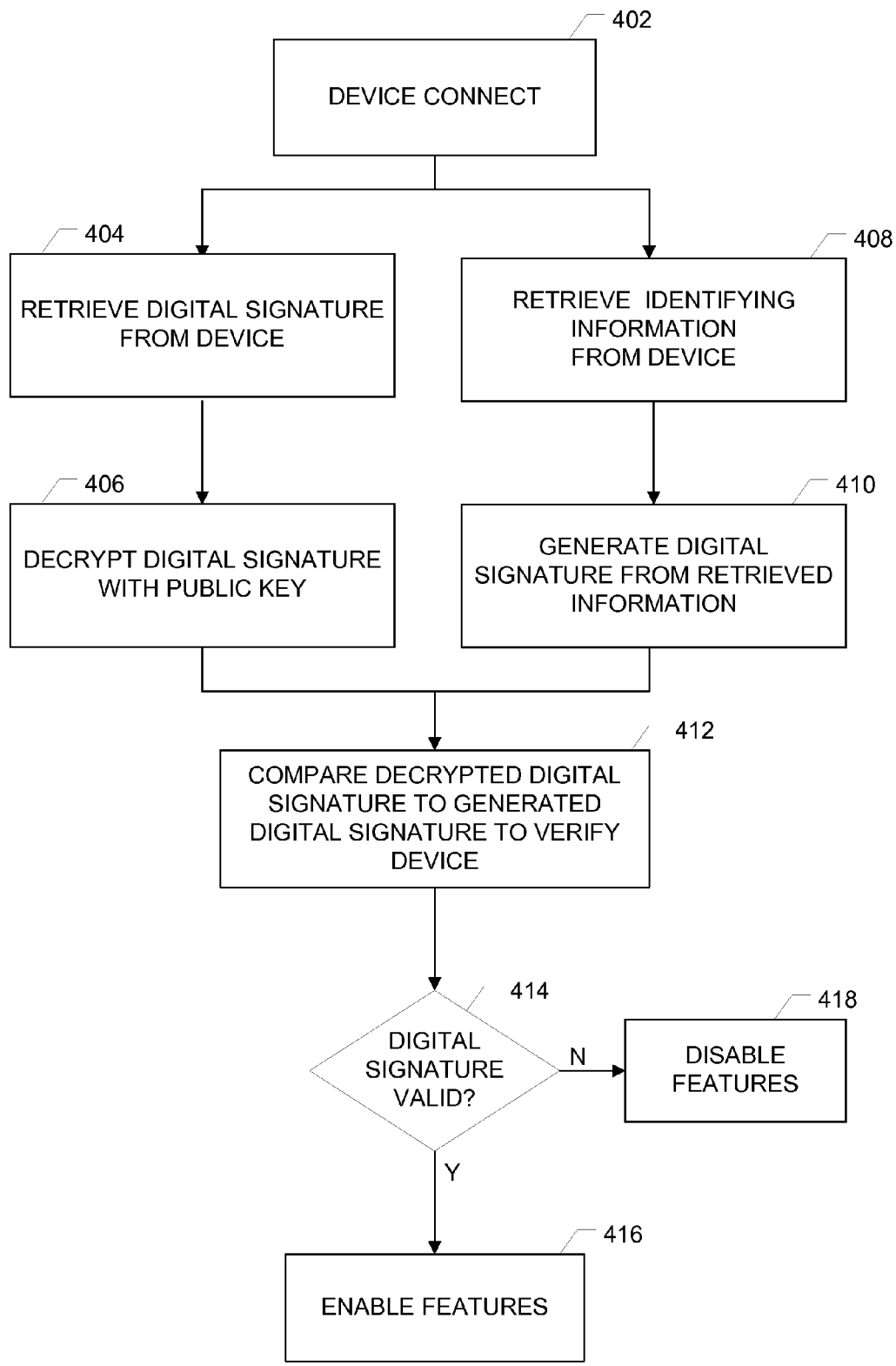
FIG. 4 is a flowchart of an exemplary embodiment of a method for verifying the certification of a firmware of a portable media device.

FIG. 4 illustrates an embodiment of the invention for verifying the firmware 108 installed on the portable media device 102 was verified under the method illustrated in FIG. 3 by the multimedia management application 106. At 402, the portable media device 102 connects to the personal computing device 104. At 404, the digital signature is received from the portable media device 102. At 406, the digital signature is unencrypted at 304. In an embodiment, the digital signature is unencrypted using the public key of the verifying application. In this embodiment, the public key corresponds to the private key used to encrypt the digital signature at 306.

At 408, identifying information is received from the portable media device. In an embodiment, the hardware identifier and the firmware version are received from the portable media device 102. Then, at 410, a digital signature is generated from the retrieved information. In an embodiment, the digital signature is a hash generated from the received hardware identifier and the firmware version of the portable media device 102.

At 412, a comparison of the digital signature decrypted at 406 and the digital signature generated at 410 is made. In an embodiment, features of the multimedia management application 106 are selectively enabled by the personal computing device 104 as a function of the received the digital signature, the hardware identifier and the firmware version number. At 414, if the digital signature decrypted at 406 matches the digital signature generated at 410, features of the multimedia management application 106 are enabled at 416, such as the firmware update shown in FIG. 2. If not, features of the multimedia management application 106 are not allowed or disabled at 418.

Referring again to FIG. 1, for purposes of illustration, programs and other executable program components, such as the multimedia management application 106, are illustrated herein as discrete blocks. It is recognized, however, that such programs and components reside at various times in different storage components of the computer, and are executed by the data processor(s) of the computer.

Embodiments of the invention may be described in the general context of computer-executable instructions, such as the program modules of multimedia management application 106, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, portable media devices 102, computers and servers 104, 112, 116A, 116B execute computer-executable instructions such as those illustrated in the figures to implement aspects of the invention. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modification and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawing shall be interpreted as illustrative and not in a limiting sense.

What is claimed is:

1. A system for providing a firmware upgrade to a portable media device wherein the portable media device includes a firmware and an identifier, said firmware including a version number, and said identifier associated with a model of the portable media device, said system comprising:

one or more firmware upgrade servers for providing the firmware upgrade for the portable media device, said firmware upgrade including a version number, said firmware upgrade associated with the identifier of the portable media device;

a firmware link server for receiving firmware upgrade requests, said firmware link server including a firmware database, said firmware database including the identifier of the portable media device, the version number of the firmware upgrade, and an address where the firmware upgrade may be accessed, said firmware link server executing a redirector that intercepts requests for XML documents containing firmware upgrade information and generating the requested XML documents based on parameters included in the requests; and a computing device executing a multimedia management application, said multimedia management application being logically connected to the portable media device, said multimedia management application including functionality for:

receiving the installed firmware version number and a device identifier from the portable media device;

sending a request to the firmware link server for an XML document containing firmware update information, said request including the device identifier from the portable media device;

receiving the requested XML document from the firmware link server, said XML document including the firmware upgrade version number and the location of the firmware upgrade;

selectively applying the firmware upgrade to the connected portable media device as a function of the firmware upgrade version number and the installed firmware version number including determining if the firmware upgrade should be applied to the connected portable media device as a function of the firmware upgrade version number and the installed firmware version number; wherein if it is determined that the firmware upgrade should be applied to the portable media device, then:

retrieving the firmware upgrade from the received location;

copying the retrieved files to the portable media device player; and providing a notification to the portable media device to apply the copied firmware upgrade.

2. The system of claim 1 wherein the firmware upgrade is applied to the connected portable media device if the installed firmware version number is less than firmware upgrade version number.

3. The system of claim 1 wherein the portable media device can play files in at least one of the following formats: MPEG (Moving Picture Experts Group), DivX, XviD, MP3 (MPEG-1 Audio Layer 3), WAV (Waveform audio format), Ogg Vorbis, JPEG (Joint Photographic Experts Group), WMA (Windows Media Audio), WMV (Windows Media Video), ASF (Advanced Systems Format or Advanced Streaming Format) and GIF (Graphics Interchange Format).

4. The system of claim 1 wherein the firmware upgrade is stored in a flash read-only storage media ("ROM") of the portable media device.

5. The system of claim 1 wherein firmware upgrade is implemented via a Media Transfer Protocol.

6. A method for upgrading a firmware of a portable media device, the portable media device including a firmware and an identifier, said firmware for operating said portable media device, said firmware including a version number, and said identifier associated with a hardware identifier of the portable media device, said portable media device being connected to a computing device executing a multimedia management application, said method comprising:

receiving, by the multimedia management application, the firmware version number and the identifier from the portable media device, said portable media device being logically connected to the multimedia management application;

sending, by the multimedia management application, a request to a firmware database, said request including the identifier from the portable media device;

receiving, by the multimedia management application, a firmware upgrade version number and a location of the firmware upgrade, said firmware upgrade version number being associated with the firmware upgrade wherein the location indicates an address where the firmware upgrade may be accessed;

determining, by the multimedia management application, if the firmware upgrade should be applied to the connected portable media device as a function of the firmware upgrade version number and the installed firmware version number; and in response to determining that the firmware upgrade should be applied to the portable media device:

retrieving, by the multimedia management application, the firmware upgrade files from the received location;

copying, by the multimedia management application, the retrieved files to the portable media device player;

providing, by the multimedia management application, a notification to the portable media device to apply the copied firmware upgrade, said multimedia management application thereafter logically reconnecting to the portable media device;

storing the date of the last request sent to the firmware database in a device table in a media library of a multimedia management application of the computing device; and sending a request to the firmware database as a function of the number of days since the last sent request.

7. The method of claim 6 wherein the request to the firmware database is a web request.

8. The method of claim 6 wherein the received firmware upgrade version number and the received location of the firmware upgrade are within an XML (Extensible Markup Language) document.

9. The method of claim 6 wherein the received XML document further includes at least one of the following: a hardware identifier; a manufacturer name; a model name; a date of firmware update; a description of the firmware update; and URL to web site that provides more information on the firmware update.

10. The method of claim 6 wherein the request further includes at least one of the following: a system locale of the operating system of the personal computing device; a unique identification number for a geographical region, country, city, or location of the operating system of the personal computing device; a version of a multimedia management application of the computing device; a locale of the current user; a hardware identifier of the portable media device; a firmware version of the portable media device; a model identifier of the portable media device; and a manufacturer identifier of the portable media device.

11. The method of claim 6 wherein the location to retrieve the firmware upgrade is in a URL format.

12. The method of claim 6 wherein the firmware upgrade is in a compressed and archived format.

13. The method of claim 6 wherein the retrieved firmware upgrade file is digitally signed to verify it is from a trusted source.

14. The method of claim 6 wherein the copied firmware upgrade file is tagged as a firmware update.

15. A method for verifying at a computing device the functionality of a firmware installed on a portable media device produced by a manufacturer, said portable media device associated with a hardware identifier and a manufacturer identifier, said manufacturer identifier associated with the manufacturer, said manufacturer having installed the firmware and a generated digital signature on the portable media device, said method comprising:

testing, at the computing device, the firmware for a required functionality, said firmware being associated with a version number, said firmware being installed on the portable media device;

in response to the tested firmware having the required functionality:

connecting the portable media device to the computing device, said computing device managing multimedia for the portable media device;

receiving, by the computing device, the digital signature, the hardware identifier and the firmware version number associated with the portable media device from the portable media device; selectively enabling features, by the computing device, as a function of the digital signature, the hardware identifier and the firmware version number; and selecting enabling the upgrade of the firmware of the portable media device as a function of the digital signature, the hardware identifier and the firmware version number.

16. The method of claim 15 wherein selectively enabling comprises verifying, by the computing device, the received digital signature as a function of the received hardware identifier and the received firmware version number; and if the digital signature is verified, enabling features, by the computing device, on the computing device associated with the functionality of the tested firmware; and if the if digital signal is not verified, disabling features, by the computing device, on the computing device associated with the functionality of the tested firmware.

17. The method of claim 15 wherein the generated digital signature is encrypted with a private key and the received digital signature is decrypted with a corresponding public key.

\* \* \* \* \*